(12) United States Patent
Fujiyama et al.

(10) Patent No.: US 8,405,805 B2
(45) Date of Patent: Mar. 26, 2013

(54) LIQUID CRYSTAL DISPLAY DEVICE

(75) Inventors: Eiichi Fujiyama, Ishikawa-gun (JP); Junichi Kobayashi, Nomi-gun (JP)

(73) Assignee: Japan Display Central Inc., Fukaya-shi (JP)

( * ) Notice: Subject to any disclaimer, the term of this patent is extended or adjusted under 35 U.S.C. 154(b) by 553 days.

(21) Appl. No.: 12/400,064

(22) Filed: Mar. 9, 2009

(65) Prior Publication Data

US 2009/0231525 A1    Sep. 17, 2009

(30) Foreign Application Priority Data

Mar. 11, 2008    (JP) .................. 2008-061423

(51) Int. Cl.
*G02F 1/1335*    (2006.01)
(52) U.S. Cl. ...................................... 349/114
(58) Field of Classification Search .................. 349/114
See application file for complete search history.

(56) References Cited

U.S. PATENT DOCUMENTS 6,937,304 B2 *   8/2005   Ha et al. ................. 349/114

FOREIGN PATENT DOCUMENTS

| JP | 11-316390 | 11/1999 |
|----|-----------|---------|
| JP | 2003-43522 | 2/2003 |
| JP | 2003-270627 | 9/2003 |
| JP | 2004-144826 | 5/2004 |
| JP | 2005-250430 | 9/2005 |
| JP | 2005-266761 | 9/2005 |

OTHER PUBLICATIONS

Notice of Reasons for Rejection issued Feb. 28, 2012 in Japanese Patent Application No. 2008-061423 (with English translation).

* cited by examiner

*Primary Examiner* — Sarah Hahm
(74) *Attorney, Agent, or Firm* — Oblon, Spivak, McClelland, Maier & Neustadt, L.L.P.

(57) ABSTRACT

In a liquid crystal display device of a transflective type, each of pixels is provided with a transmissive part and a reflective part. The array substrate includes a switch element, an insulation layer which is disposed at least in the reflective part, a pixel electrode which includes a transmissive electrode disposed in the transmissive part of the pixel and a reflective electrode electrically connected to the transmissive electrode and disposed on the insulation layer in the reflective part, the pixel electrode being electrically connected to the switch element via a contact hole which is formed in the insulation layer by the reflective electrode, and a cover member which covers the reflective electrode in the contact hole and is formed of a material having a lower reflectance than the reflective electrode.

5 Claims, 5 Drawing Sheets

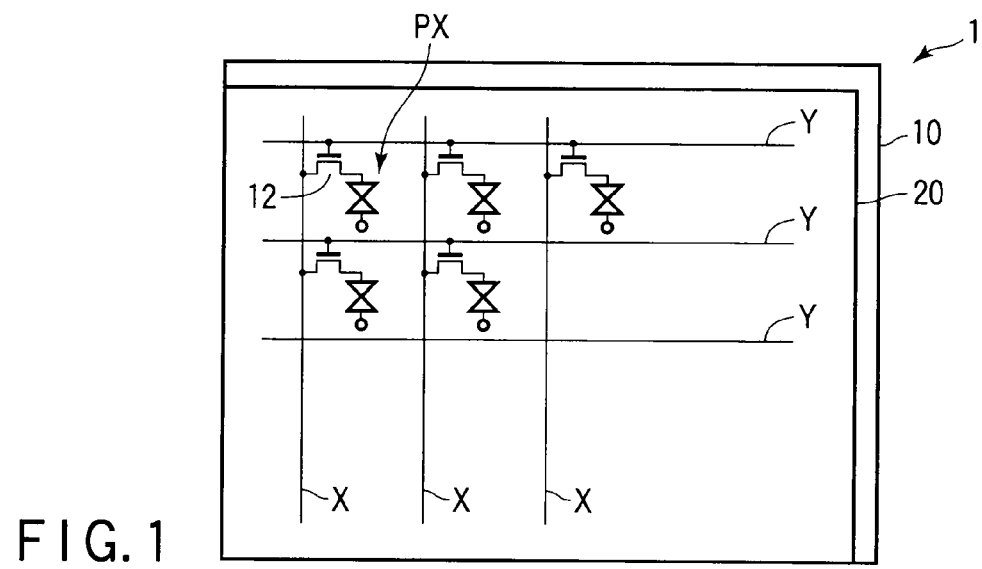
F I G. 1
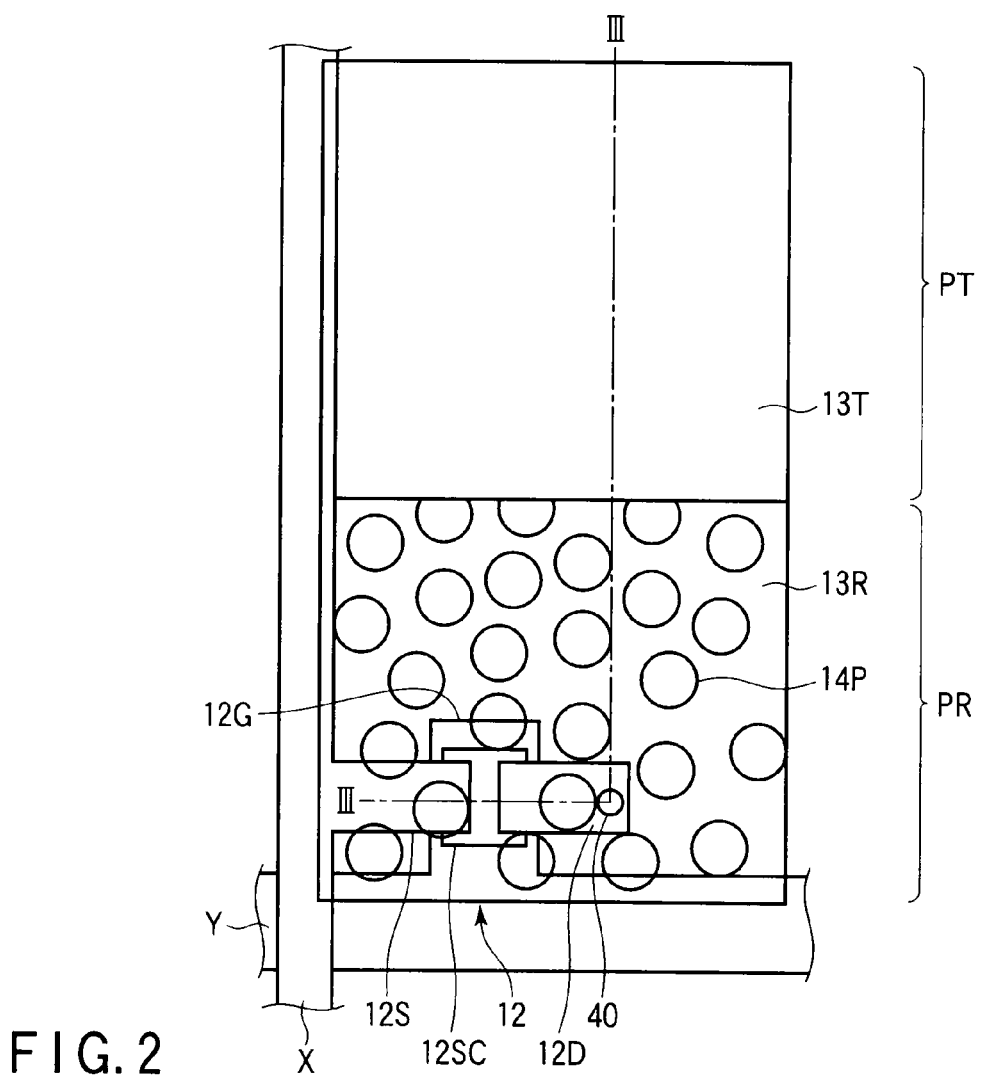
F I G. 2

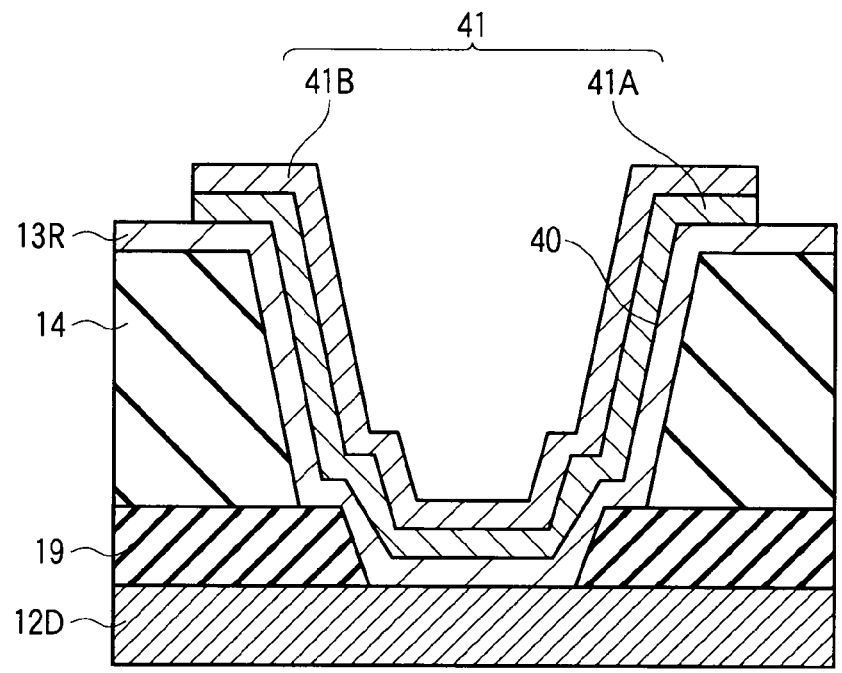
F I G. 4
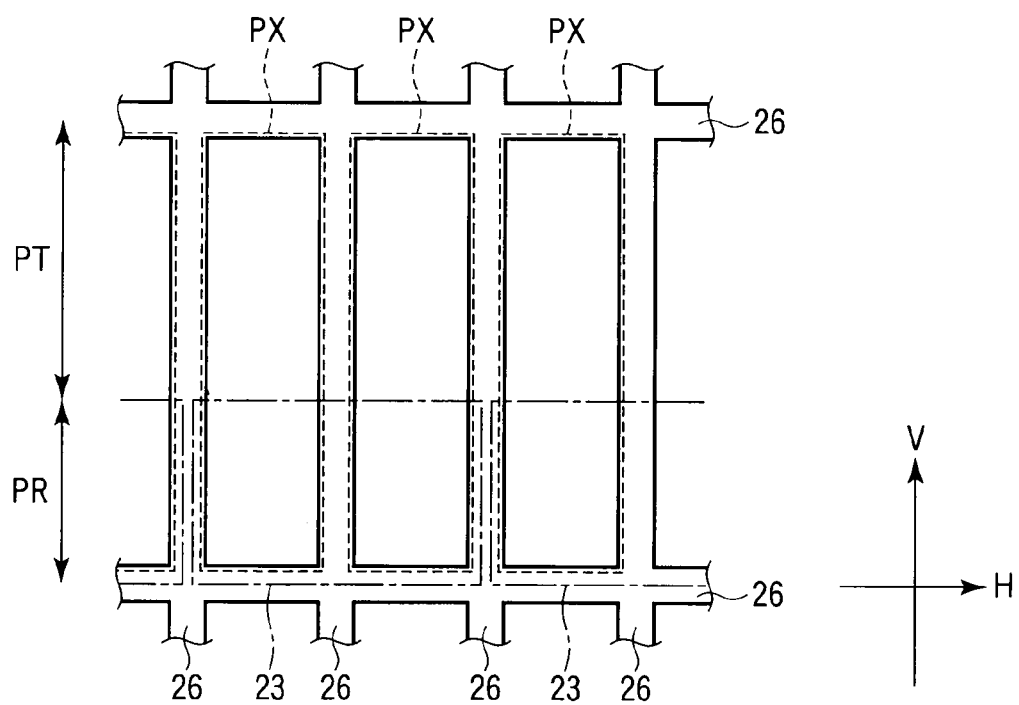
F I G. 6

LIQUID CRYSTAL DISPLAY DEVICE

CROSS-REFERENCE TO RELATED APPLICATIONS

This application is based upon and claims the benefit of priority from prior Japanese Patent Application No. 2008-061423, filed Mar. 11, 2008, the entire contents of which are incorporated herein by reference.

BACKGROUND OF THE INVENTION

1. Field of the Invention

The present invention relates generally to a liquid crystal display device, and more particularly to a transflective liquid crystal display device which includes, within one pixel, a reflective part which displays an image by making use of ambient light, and a transmissive part which displays an image by making use of backlight.

2. Description of the Related Art

A transflective liquid crystal display device includes, within the same pixel, a reflective part having a reflective electrode, and a transmissive part having a transmissive electrode. The transflective liquid crystal display device functions as a transmissive liquid crystal display device which displays an image by selectively transmitting backlight by making use of the transmissive part within the pixel, and also functions as a reflective liquid crystal display device which displays an image by selectively reflecting ambient light by making use of the reflective part within the pixel. With this structure, the power consumption can greatly be reduced.

In a liquid crystal display device which is configured such that an insulation layer is interposed between a switch element and a pixel electrode, for example, a bottom-type thin-film transistor, which is the switch element, and the pixel electrode are electrically connected via a contact hole which is formed in a resin layer (see Jpn. Pat. Appln. KOKAI Publication No. 2003-43522).

In the transflective liquid crystal display device, a proper gap differs between the reflective part and the transmissive part. In many cases, the gap at the reflective part is set to be substantially half the gap at the transmissive part.

In the above-described structure in which the pixel electrode and the switch element are electrically connected via the contact hole that is formed at the reflective part, the gap at a region where the contact hole is formed is greater than the gap at the peripheral region. Consequently, in the region where the contact hole is formed, light leak occurs and the contrast ratio at the time of reflective display lowers.

In addition, in the transflective liquid crystal display device, the gap difference between the reflective part and the transmissive part is created by making use of the difference in film thickness of the insulation layer. In this case, it is possible that at the time of voltage application, an oblique electric field may be generated between the counter-electrode and the pixel electrode, at an end portion of the insulation layer. In particular, in the normally white mode, in the case of executing black display by generating an electric field between the pixel electrode and the counter-electrode, an alignment defect of liquid crystal molecules occurs due to an oblique electric field, and light leak occurs. This leads to a decrease in contrast ratio.

BRIEF SUMMARY OF THE INVENTION

The present invention has been made in consideration of the above-described problem, and the object of the invention is to provide a liquid crystal display device which can suppress light leak and improve display quality.

According to a first aspect of the present invention, there is provided a liquid crystal display device of a transflective type, which is configured such that a liquid crystal layer is held between a first substrate and a second substrate and each of pixels is provided with a transmissive part and a reflective part, the first substrate comprising: a switch element which is disposed in each of the pixels; an insulation layer which is disposed at least in the reflective part; a pixel electrode which includes a transmissive electrode disposed in the transmissive part of the pixel and a reflective electrode electrically connected to the transmissive electrode and disposed on the insulation layer in the reflective part, the pixel electrode being electrically connected to the switch element via a contact hole which is formed in the insulation layer by the reflective electrode; and a cover member which covers the reflective electrode in the contact hole and is formed of a material having a lower reflectance than the reflective electrode.

According to a second aspect of the present invention, there is provided a liquid crystal display device of a transflective type, which is configured such that a liquid crystal layer is held between a first substrate having a pixel electrode in each of pixels and a second substrate, and each of the pixels is provided with a transmissive part and a reflective part, the second substrate comprising: a resin layer which is disposed in the reflective part and creates a gap difference of the liquid crystal layer between the transmissive part and the reflective part; a counter-electrode which covers the resin layer and is disposed to be opposed to the pixel electrode in the transmissive part and the reflective part; and a light-blocking layer which is disposed along an end portion of the resin layer.

The present invention can provide a liquid crystal display device which can suppress light leak and improve display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows the structure of a liquid crystal display device according to an embodiment of the present invention;

FIG. 2 schematically shows the structure of one pixel of a liquid crystal display panel which is applicable to the liquid crystal display device shown in FIG. 1;

FIG. 4 schematically a cross-sectional structure of a contact hole shown in FIG. 3;

FIG. 6 schematically shows a structure of the pixel of the liquid crystal display panel which is applicable to the liquid crystal display device shown in FIG. 1;

DETAILED DESCRIPTION OF THE INVENTION

A liquid crystal display device according to an embodiment of the present invention will now be described with reference to the accompanying drawings. In this embodiment, a transflective liquid crystal display device, which includes, within one pixel, a reflective part which displays an image by selectively reflecting ambient light, and a transmissive part which displays an image by selectively transmitting backlight, is taken as an example of the liquid crystal display device.

Figure 3:
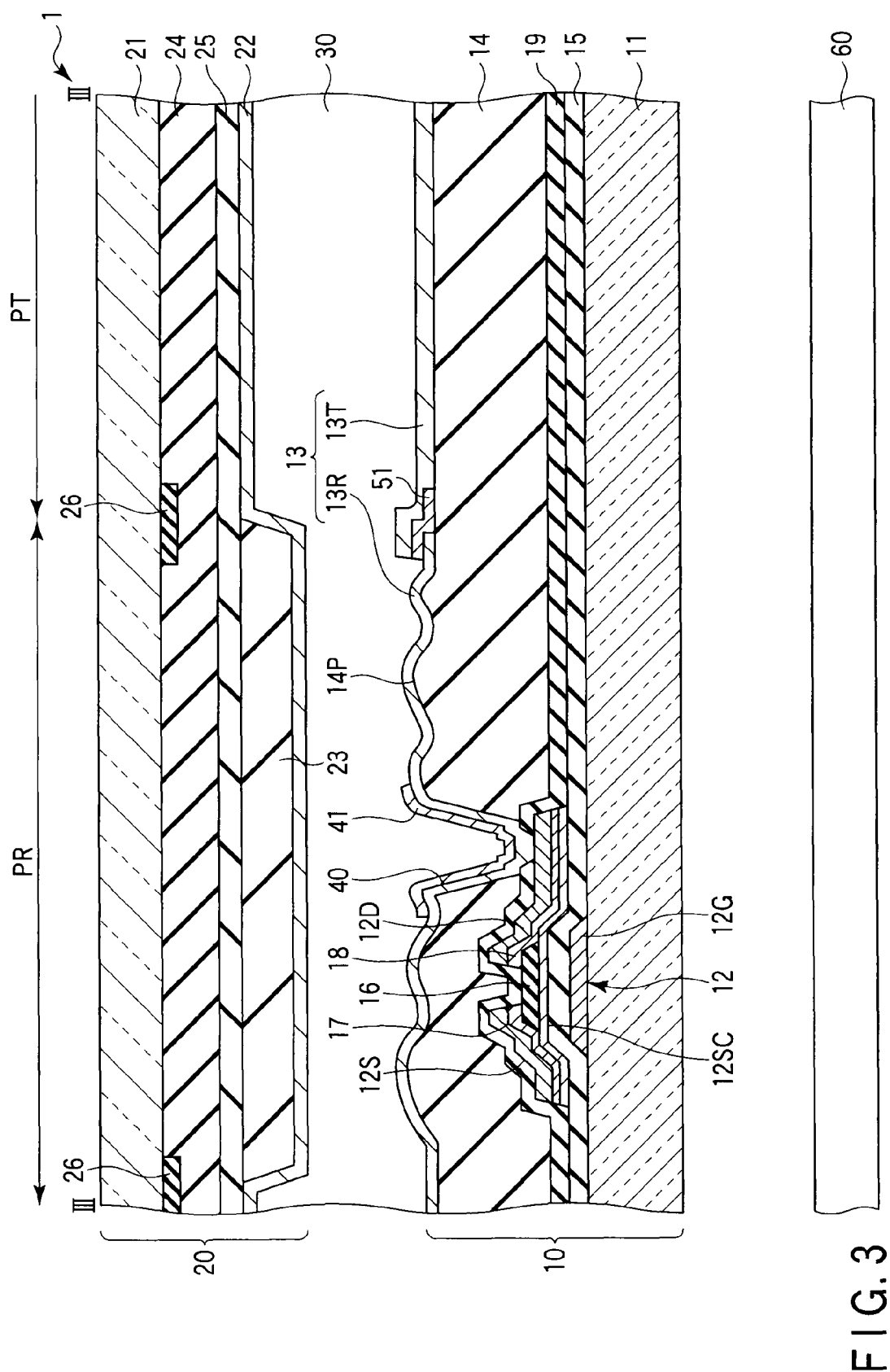
FIG. 3 schematically shows a cross-sectional structure, taken along line III-III, of the liquid crystal display panel shown in FIG. 2.

As shown in FIG. 1 to FIG. 3, the liquid crystal display device includes a liquid crystal display panel 1 and a backlight 60 which illuminates the liquid crystal display panel 1. The liquid crystal display panel 1 is configured such that a liquid crystal layer 30 is held between a pair of substrates, namely, an array substrate 10 and a counter-substrate 20. The liquid crystal display panel 1 includes a plurality of pixels PX which are arrayed in a matrix. Each of the pixels PX includes a reflective part PR and a transmissive part PT. The backlight 60 is disposed on the back side of the liquid crystal display panel 1 (i.e. on the side opposed to the array substrate 10).

The array substrate 10 is formed by using a light-transmissive insulating substrate 11 such as a glass substrate. The array substrate 10 includes, on one major surface of the insulating substrate 11, a plurality of scanning lines Y which are disposed along a row direction of the pixels PX, a plurality of signal lines X which are disposed along a column direction of the pixels PX, switch elements 12 which are disposed in association with the respective pixels PX near intersections between the scanning lines Y and signal lines X, pixel electrodes 13 which are connected to the associated switch elements 12 and are disposed in association with the respective pixels PX, and an alignment film (not shown) which is disposed on the pixel electrodes 13.

The switch element 12 is composed of, e.g. a thin-film transistor (TFT) which includes a semiconductor layer 12SC such as an amorphous silicon film or a polycrystalline silicon film.

A gate electrode 12G of the switch element 12 is disposed on the insulating substrate 11. The gate electrode 12G is connected to the scanning line Y (or the gate electrode 12G is formed integral with the scanning line Y). The gate electrode 12G and scanning line Y are formed of, e.g. molybdenum-tungsten (MoW). The gate insulation film 15 covers the gate electrode 12G and scanning line Y. The gate insulation film 15 is formed of an inorganic material, such as a silicon oxide (SiO) film or a silicon nitride (SiN) film. The semiconductor layer 12SC is disposed on the gate insulation film 15, and a channel region of the semiconductor layer 12SC is covered with a protection film 16.

A source electrode 12S of the switch element 12 is put in contact with the semiconductor layer 12SC via a low-resistance film 17. The source electrode 12S is connected to the signal line X (or the source electrode 12S is formed integral with the signal line X). A drain electrode 12D of the switch element 12 is put in contact with the semiconductor layer 12SC via a low-resistance film 18.

The source electrode 12S, drain electrode 12D and signal line X are formed of, e.g. a multi-layer structure in which molybdenum (Mo)/aluminum (Al)/molybdenum (Mo) layers are stacked in the named order.

The source electrode 12S and drain electrode 12D are covered with an interlayer insulation film 19. The interlayer insulation film 19 is formed of an inorganic material, such as a silicon nitride (SiN) film. The interlayer insulation film 19 is covered with an organic insulation film 14 which is formed of an organic material. An irregular pattern 14P is formed on the surface of the organic insulation film 14 in the reflective part PR, for example, with the aim to improve the display quality in reflective display. In this embodiment, in order to avoid a decrease in aperture ratio of the transmissive part PT, the switch element 12 is disposed in the reflective part PR and is covered with the interlayer insulation film 19 and organic insulation film 14.

The pixel electrode 13 includes a reflective electrode 13R which is disposed in the reflective part PR, and a transmissive electrode 13T which is disposed in the transmissive part PT. The reflective electrode 13R and transmissive electrode 13T are electrically connected. The pixel electrode 13 is disposed on the organic insulation film 14. The reflective electrode 13R covers the surface of the irregular pattern 14P of the organic insulation film 14. The reflective electrode 13R is formed of a light-reflective, electrically conductive material, such as aluminum. The transmissive electrode 13T is formed of a light-transmissive, electrically conductive material, such as indium tin oxide (ITO).

On the other hand, the counter-substrate 20 is formed by using a light-transmissive insulating substrate 21 such as a glass substrate. The counter-substrate 20 includes, on one major surface of the insulating substrate 21, a counter-electrode 22 which is disposed in common to the plural pixels PX, a resin layer 23 for providing a gap difference of the liquid crystal layer 30 between the reflective part PR and the transmissive part PT, and an alignment film (not shown) which is disposed on the counter-electrode 22.

The counter-electrode 22 is disposed to be opposed to the pixel electrodes 13 of the plural pixels PX via the liquid crystal layer 30. The counter-electrode 22 is formed of a light-transmissive, electrically conductive material such as ITO.

In the case of a color display type liquid crystal display device, the counter-substrate 20 includes a color filter layer 24 which is provided on the inner surface of the liquid crystal display panel 1 in association with each pixel PX. The color filter layer 24 is formed of color resins of a plurality of different colors, for instance, the three primary colors of red, blue and green. The red color resin, blue color resin and green color resin are disposed in association with a red pixel, a blue pixel and a green pixel, respectively. The counter-substrate 20 includes an overcoat layer 25. The overcoat layer 25 is disposed on the color filter layer 24, thereby reducing the influence of the irregularity on the surface of the color filter layer 24. In the example of the color display type liquid crystal display device shown in FIG. 3, the color filter 34 is disposed on the counter-substrate 20 side, but it may be disposed on the array substrate 10 side.

The gap between the array substrate 10 and counter-substrate 20 is so set as to be different between the reflective part PR and transmissive part PT. Proper gaps are set in the reflective part PR and transmissive part PT, respectively. In many cases, the gap in the reflective part PR is set to be substantially half the gap in the transmissive part.

Such a gap difference is provided by the resin layer 23. The resin layer 23 is disposed on the overcoat layer 25 in association with the reflective part PR. Accordingly, a gap difference, which is substantially equal to the thickness of the resin layer 23, is created between the reflective part PR and transmissive part PT. This resin layer 23 is formed of a light-transmissive resin material.

The counter-electrode 22 covers the resin layer 23 in the reflective part PR and covers the overcoat layer 25 in the transmissive part PT. In this manner, a substantial gap is created between the reflective electrode 13R and counter-electrode 22 in the reflective part PR, and a substantial gap is created between the transmissive electrode 13T and counter-electrode 22 in the transmissive part PT.

The array substrate 10 and counter-substrate 20, which have the above-described structure, are disposed in the state in which a predetermined gap is kept therebetween by spacers (not shown), and the array substrate 10 and counter-substrate 20 are attached by a sealant. The liquid crystal layer 30 is sealed in the gap between the array substrate 10 and the counter-substrate 20.

By the way, the interlayer insulation film 19 and organic insulation film 14 are interposed, as insulation layers, between the switch element 12 and pixel electrode 13. The reflective electrode 13R is put in contact with the drain electrode 12D via a contact hole 40 which is formed in the organic insulation film 14. Thereby, the pixel electrode 13 is electrically connected to the switch element 12. However, the gap at the contact hole 40 is greater than the gap at the reflective part PR in the vicinity of the contact hole 40, and a proper gap for the reflective part PR is not created at the contact hole 40. Consequently, even if the reflective electrode 13R is disposed in the contact hole 40, light leak occurs at the time of black display.

To cope with this problem, in the present embodiment, the contact hole 40 is covered with a cover member 41. The cover member 41 is disposed on the reflective electrode 13R in the contact hole 40. The cover member 41 is formed of a material having a lower reflectance than the reflective electrode 13R, for example, molybdenum.

In this example, as shown in FIG. 4, the cover member 41 is composed of a first electrically conductive layer 41A which is formed of molybdenum, and a second electrically conductive layer 41B which is formed of the same material as the transmissive electrode 13T, for instance, ITO. The first electrically conductive layer 41A is disposed on the reflective electrode 13R. The second electrically conductive layer 41B is disposed on the first electrically conductive layer 42A.

In the reflective part PR, since the contact hole 40 is covered with the cover member 41, the reflectance at the contact hole 40 becomes lower than the reflectance of the reflective electrode 13R. Thereby, light leak at the contact hole 40 can be suppressed at the time of black display, and the contrast ratio at the time of reflective display can be improved.

Figure 5:
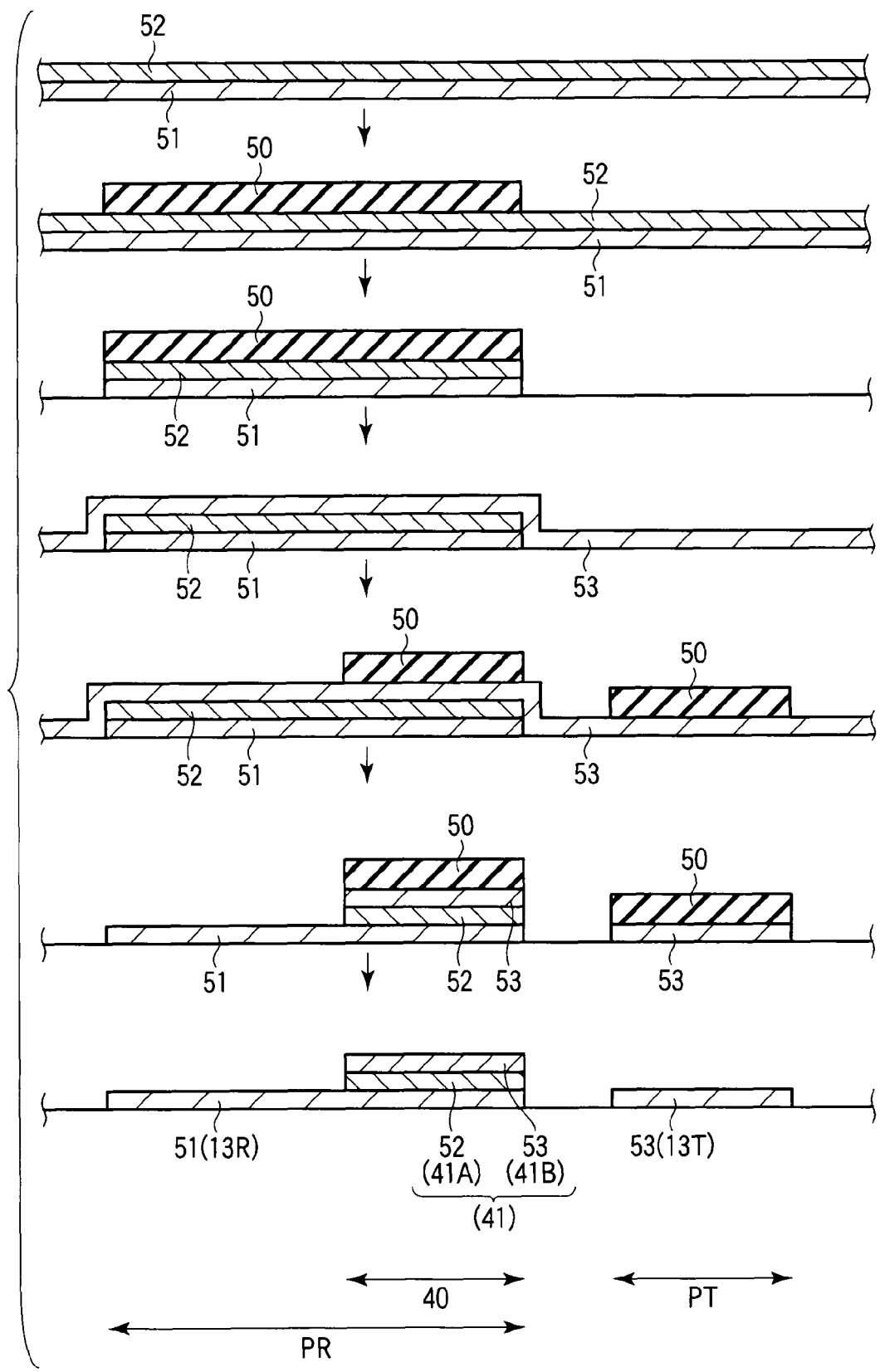
FIG. 5 schematically illustrates a process of forming a pixel electrode and a contact hole shown in FIG. 3.

Referring now to FIG. 5, a schematic description is given of the process of forming the reflective electrode 13R, transmissive electrode 13T and cover member 41.

To begin with, a film of aluminum 51 is formed on the organic insulation film 14 as an electrically conductive material for forming the reflective electrode 13R. At this time, the aluminum 51 is also disposed in the contact hole 40 and is put in contact with the drain electrode 12D. Subsequently, a film of molybdenum 52 is formed on the aluminum 51.

A resist 50 is disposed on a region corresponding to the reflective part PR including the contact hole 40. Those portions of the aluminum 51 and molybdenum 52, which are disposed on the region exposed from the resist 50, are etched away. Then, the resist 50 is removed.

Next, a film of ITO 53 is formed as an electrically conductive material for forming the transmissive electrode 13T. A resist 50 is disposed on regions corresponding to the contact hole 40 and the transmissive part PT, and the ITO that is exposed from the resist 50 is etched away. The molybdenum 52, as well as the ITO 53, is removed in the reflective part PR by controlling the etching rate. Then, the resist 50 is removed.

Thereby, in the reflective part PR, the reflective electrode 13R is formed of the aluminum 51. In addition, the contact hole 40 is covered with the cover member 41 which is formed by stacking the molybdenum 52 and ITO 53 on the reflective electrode 13R. In the transmissive part PT, the transmissive electrode 13T is formed of the ITO 53.

At a boundary part between the transmissive electrode 13T and reflective electrode 13R, the aluminum 51 (13R) and the ITO 53 (13T) are electrically connected via the molybdenum 52 having relatively good adhesiveness to the aluminum 51 and ITO 53. Thus, peeling between the aluminum 51 and ITO 53 can be suppressed, and electrical connection therebetween can be secured.

On the other hand, there is a case in which an end portion of the resin layer 23 is formed as an oblique surface portion. In such a case, at the end portion of the resin layer 23, an unwanted oblique electric field is formed between the pixel electrode 13 and counter-electrode 22 at the time of voltage application. This oblique electric field may cause an alignment defect of liquid crystal molecules, and may become a factor of light leak.

To cope with this problem, in the present embodiment, the counter-substrate 20 further includes a light-blocking layer 26. As shown in FIG. 3, the light-blocking layer 26 is formed on the insulating substrate 21, and is disposed along an end portion of the resin layer 23. The light-blocking layer 26 is formed, for example, of a black color resin.

By disposing the light-blocking layer 26 over the region with a predetermined width including the end portion of the resin layer 23, the region where an oblique electric field may be generated can be shielded from light, and light leak due to the oblique electric field can be suppressed. Therefore, the contrast ratio can be improved at the time of transmissive display and reflective display.

The light-blocking layer 26 is disposed along at least one of end portions in the longitudinal direction of the resin layer 23.

In an example shown in FIG. 6, the region layer 23 is formed in a rectangular shape, and is disposed in an island shape over the reflective parts PR of two pixels PX. In this case, the light-blocking layer 26 is disposed along one end portion in the longitudinal direction (row direction H in this example) of the resin layer 23, and also the light-blocking layer 26 is disposed along both end portions in the column direction V.

Figure 7:
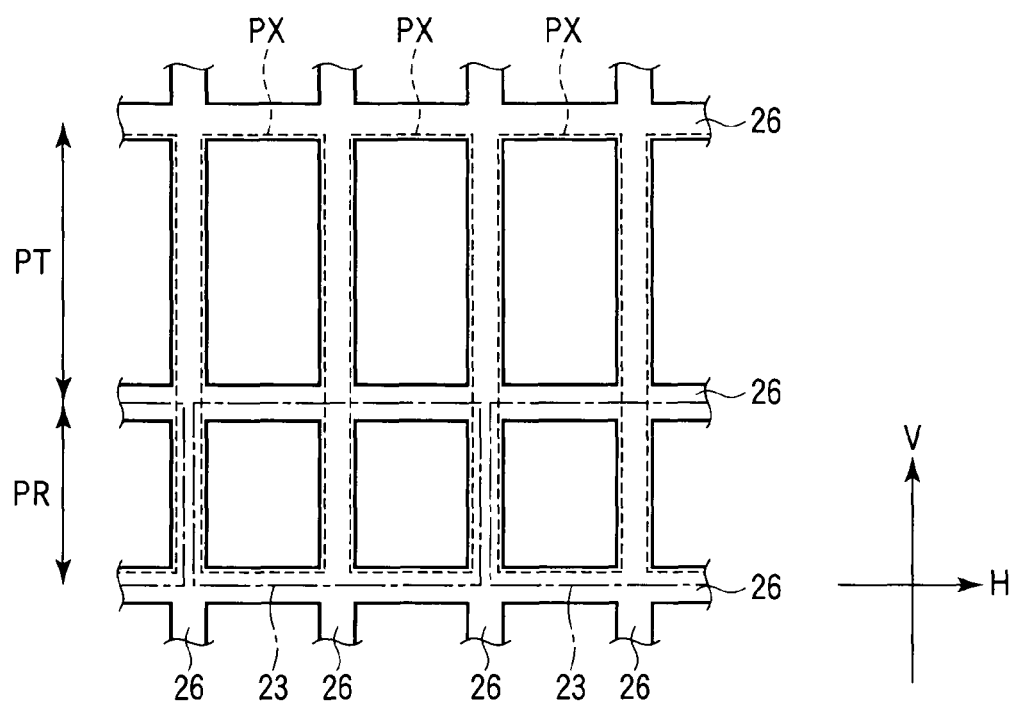
FIG. 7 schematically shows another structure of the pixel of the liquid crystal display panel which is applicable to the liquid crystal display device shown in FIG. 1.

In an example shown in FIG. 7, the light-blocking layer 26 is disposed along four end portions of the resin layer 23. In this example, light leak is suppressed from the entire periphery of the resin layer 23, and a higher contrast ratio can be realized than in the example shown in FIG. 6.

In order to surely suppress light leak, it is necessary to increase the width of the light-blocking layer 26, but this causes a decrease in aperture ratio. It is desirable, therefore, to set the width of the light-blocking layer 26 so as to minimize the decrease in aperture ratio, while suppressing light leak.

Furthermore, it is important to suppress the decrease in aperture ratio (i.e. the decrease in transmittance which contributes to transmissive display and the decrease in reflectance which contributes to reflective display) due to the light-blocking layer 26 when misalignment occurs in the column direction V between the array substrate 10 and counter-substrate 20. In the example shown in FIG. 6, the light-blocking layer 26 is disposed along one end portion in the longitudinal direction, and thus the decrease in aperture ratio due to the influence of misalignment can be more suppressed than in the case of the example in FIG. 7 in which the light-blocking layer 26 is disposed along both end portions in the longitudinal direction.

In the examples shown in FIG. 6 and FIG. 7, a description has been given of the case in which the resin layer 23 is formed in an island shape. Alternatively, the resin layer 23 may be formed in a strip shape extending in the row direction H in common to a plurality of pixels PX. In this case, the light-blocking layer 26 may be disposed in the row direction, and may not be disposed in the column direction V of each pixel PX. Even in the case where the resin layer 23 with this shape is applied, the same advantageous effects as in the present embodiment can be obtained.

Next, a description is given of the result of the verification which was conducted with respect to the advantageous effects of the transflective liquid crystal display device according to the present embodiment.

Three samples A, B and C were prepared.

In sample A, the light-blocking layer 26 along the end portion of the resin layer 23 is not disposed. In sample B, the light-blocking layer 26 is disposed on one side in the row direction H of the resin layer 23, and on both sides in the column direction V (the example of FIG. 6). In sample C, the light-blocking layer 26 is disposed on both sides in the row direction H of the resin layer 23, and on both sides in the column direction V (the example of FIG. 7).

With respect to the samples A, B and C, the contract ratio was measured with simple driving, under the condition that a contact hole 40 with a size of 12×12 µm was used (condition 1), the condition that a contact hole 40 with a size of 10.5×10.5 µm was used (condition 2), and the condition that a contact hole 40 with a size of 10.5×10.5 µm, which is covered with the cover member 41, was used (condition 3).

The driving voltage, which was output to the signal line at this time, was 0V to 6V in rectangular waveform with a frequency of 60 Hz, the driving voltage that was output to the scanning line was DC 12V, and the potential of the counter-electrode was GND. Polarizers were disposed on both surfaces of the liquid crystal display panel so as to realize the normally white mode.

With respect to each of the samples, the reflectance at the reflective part PR was measured under each of the conditions. The measured reflectance in this case corresponds to the intensity of reflective light from the reflective part, relative to the intensity of white ambient light (incident light) which is incident from the counter-substrate 20 side of the liquid crystal display device. The reflectance was measured by a reflectometer CM-508d (manufactured by MINOLTA). The incident light is diffuse light which is incident in a direction substantially perpendicular to the counter-substrate 20 (i.e. the normal to the counter-substrate 20). The intensity of reflective light was measured by a detector which was disposed at a position with an inclination of 8° from the normal direction of the counter-substrate 20.

Figure 8:
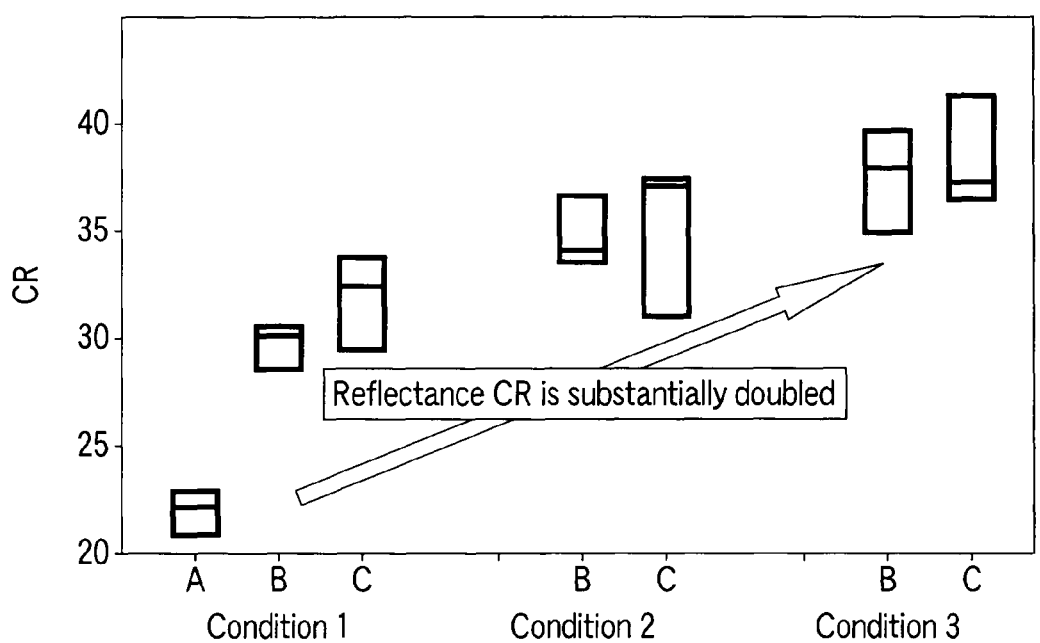
FIG. 8 shows a verification result of the advantageous effect which is obtained by disposing a cover member and a light-blocking layer.

FIG. 8 shows the measurement result. It is understood that in each of the conditions, the contrast ratio (CR) is higher in sample B than in sample A, and is higher in sample C than in sample B. In short, it is understood that the contrast ratio is increased by disposing the light-blocking layer 26 on one side, and the contrast ratio is more increased by disposing the light-blocking layer 26 on both sides.

In addition, it is also understood that the contrast ratio of each of samples B and C is higher in condition 2 than in condition 1, and is still higher in condition 3. It is thus understood that the contrast ratio is increased by decreasing the size of the contact hole, and is further increased by using the cover member 41.

In sample A, in the case where the contact hole 40 with a size of 12×12 µm was used, the contrast ratio was about 20:1. By contrast, in sample C, in the case where the contact hole 40 with a size of 10.5×10.5 µm was used and the contact hole was covered with the cover member 41, the contrast ratio was 40:1. Specifically, compared to the case where neither the light-blocking layer 26 nor the cover member 41 was used, the contrast ratio was doubled in the case where the light-blocking layer 26 and the cover member 41 were used.

As has been described above, according to the present embodiment, the light leak can be suppressed and the contrast ratio can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device of a transflective type, which is configured such that a liquid crystal layer is held between a first substrate and a second substrate and each of pixels is provided with a transmissive part and a reflective part, the first substrate comprising:
   a switch element which is disposed in each of the pixels;
   an insulation layer which is disposed at least in the reflective part;
   a pixel electrode which includes a transmissive electrode disposed in the transmissive part of the pixel and a reflective electrode electrically connected to the transmissive electrode and disposed on the insulation layer in the reflective part, the pixel electrode being electrically connected to the switch element via a contact hole which is formed in the insulation layer by the reflective electrode; and
   a cover member which covers the reflective electrode in the contact hole, exposes the reflective electrode on the insulation layer, and is formed of a material having a lower reflectance than the reflective electrode.

2. The liquid crystal display device according to claim 1, wherein the cover member is formed of molybdenum.

3. The liquid crystal display device according to claim 1, wherein the cover member includes a first electrically conductive layer which is disposed on the reflective electrode and is formed of molybdenum, and a second electrically conductive layer which is disposed on the first electrically conductive layer and is formed of the same material as the transmissive electrode.

4. The liquid crystal display device according to claim 3, wherein the reflective electrode is formed of aluminum and the transmissive electrode is formed of indium tin oxide.

5. The liquid crystal device according to claim 1, wherein the transmissive electrode and the reflective electrode are connected via molybdenum which is placed along the boundary between the transmissive electrode and the reflective electrode.

* * * * *